United States Patent
Caruntu

(10) Patent No.: US 9,721,003 B2
(45) Date of Patent: Aug. 1, 2017

(54) METHOD AND APPARATUS FOR PROVIDING CONTEXTUAL BASED SEARCHES

(75) Inventor: Alexandru Mihai Caruntu, Cluj-Napoca (RO)

(73) Assignee: NOKIA TECHNOLOGIES OY, Espoo (FI)

( * ) Notice: Subject to any disclaimer, the term of this patent is extended or adjusted under 35 U.S.C. 154(b) by 746 days.

(21) Appl. No.: 13/163,863

(22) Filed: Jun. 20, 2011

(65) Prior Publication Data
US 2012/0323951 A1 Dec. 20, 2012

(51) Int. Cl.
G06F 17/30 (2006.01)
G06F 15/16 (2006.01)

(52) U.S. Cl.
CPC .... *G06F 17/30663* (2013.01); *G06F 17/3064* (2013.01); *G06F 17/30637* (2013.01)

(58) Field of Classification Search
USPC .................................. 707/767, 771
See application file for complete search history.

(56) References Cited

U.S. PATENT DOCUMENTS

| | | | |
|---|---|---|---|
| 5,113,340 A * | 5/1992 | McWherter | 715/236 |
| 7,984,035 B2 | 7/2011 | Levin et al. | |
| 2004/0167771 A1 * | 8/2004 | Duan et al. | 704/10 |
| 2005/0108213 A1 | 5/2005 | Riise et al. | |
| 2007/0136251 A1 | 6/2007 | Colledge et al. | |
| 2007/0260598 A1 | 11/2007 | Odom | |
| 2008/0005068 A1 | 1/2008 | Dumais et al. | |
| 2010/0057728 A1 | 3/2010 | Quick et al. | |
| 2010/0250530 A1 | 9/2010 | Wang et al. | |
| 2010/0306211 A1 | 12/2010 | Chaudhuri et al. | |

OTHER PUBLICATIONS

International Search Report for related International Patent Application No. PCT/FI2012/050535 dated Nov. 20, 2012, pp. 1-4.
Written Opinion for related International Patent Application No. PCT/FI2012/050535 dated Nov. 20, 2012, pp. 1-8.

* cited by examiner

*Primary Examiner* — Alex Gofman
(74) *Attorney, Agent, or Firm* — Ditthavong & Steiner, P.C.

(57) ABSTRACT

An approach is presented for providing contextual based searches. A contextual query platform processes at least one query to parse one or more terms associated with at least one contextual parameter. The platform further determines one or more values and/or one or more probabilities associated with the one or more values for the at least one contextual parameter based on one or more probabilistic models associated with the at least one contextual parameter. The platform further compares the one or more values and/or the one or more probabilities against at least one threshold criteria. The platform further determines whether to process the at least one query using the one or more values, to generate a recommendation for using the one or more values, to determine one or more alternate values, or a combination thereof based, at least in part, on the comparison.

20 Claims, 9 Drawing Sheets

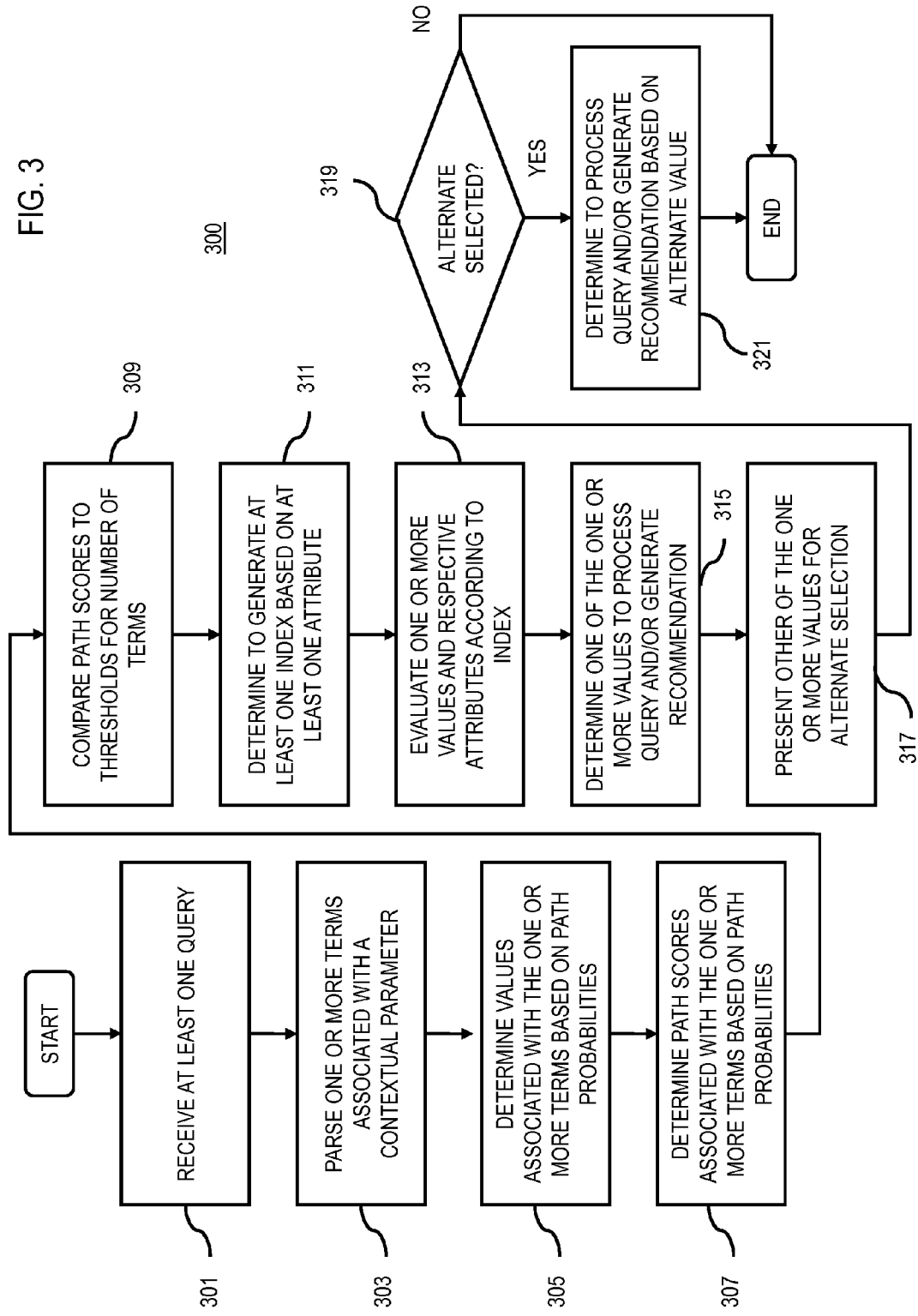

METHOD AND APPARATUS FOR PROVIDING CONTEXTUAL BASED SEARCHES

BACKGROUND

Service providers and device manufacturers (e.g., wireless, cellular, etc.) are continually challenged to deliver value and convenience to consumers by, for example, providing compelling network services. One such network service is providing consumers the ability to search for various content. Often, a consumer will search for content pertaining to a specific contextual parameter. For example, a consumer may wish to determine movies that are playing in a specific city. Moreover, a consumer may wish to locate a specific one of many similar stores, such as a specific clothing store of a chain of clothing stores or a specific one of franchised chain of restaurants. Certain methods for linking specific content to a specific contextual parameter or element exist. However, these methods usually require having sensors that automatically detect the contextual parameter of the consumer, or fast amounts of previously acquired information to guess the contextual parameter based on the consumer's previous contextual parameters. As such, service providers face significant technical challenges to provide searching services that allow for tailoring of content results based on contextual parameters.

SOME EXAMPLE EMBODIMENTS

Therefore, there is a need for an approach for providing contextual based searches for content related to a contextual parameter without the need of sensors, large amounts of search history, and/or processing power.

According to one embodiment, a method comprises processing and/or facilitating a processing of at least one query to cause, at least in part, a parsing of one or more terms associated with at least one contextual parameter. The method also comprises processing and/or facilitating a processing of the one or more terms to determine one or more values, one or more probabilities associated with the one or more values, or a combination thereof for the at least one contextual parameter based, at least in part, on one or more probabilistic models associated with the at least one contextual parameter. The method further comprises causing, at least in part, a comparison of the one or more values, the one or more probabilities, or a combination thereof against at least one threshold criteria. The method also comprises determining whether to process the at least one query using the one or more values, to generate a recommendation for using the one or more values, to determine one or more alternate values, or a combination thereof based, at least in part, on the comparison.

According to another embodiment, an apparatus comprises at least one processor, and at least one memory including computer program code for one or more programs, the at least one memory and the computer program code configured to, with the at least one processor, cause, at least in part, the apparatus to process and/or facilitate a processing of at least one query to cause, at least in part, a parsing of one or more terms associated with at least one contextual parameter. The apparatus is also caused to process and/or facilitate a processing of the one or more terms to determine one or more values, one or more probabilities associated with the one or more values, or a combination thereof for the at least one contextual parameter based, at least in part, on one or more probabilistic models associated with the at least one contextual parameter. The apparatus is further caused to compare the one or more values, the one or more probabilities, or a combination thereof against at least one threshold criteria. The apparatus is also caused to determine whether to process the at least one query using the one or more values, to generate a recommendation for using the one or more values, to determine one or more alternate values, or a combination thereof based, at least in part, on the comparison.

According to another embodiment, a computer-readable storage medium carries one or more sequences of one or more instructions which, when executed by one or more processors, cause, at least in part, an apparatus to process and/or facilitate a processing of at least one query to cause, at least in part, a parsing of one or more terms associated with at least one contextual parameter. The apparatus is also caused to process and/or facilitate a processing of the one or more terms to determine one or more values, one or more probabilities associated with the one or more values, or a combination thereof for the at least one contextual parameter based, at least in part, on one or more probabilistic models associated with the at least one contextual parameter. The apparatus is further caused to compare the one or more values, the one or more probabilities, or a combination thereof against at least one threshold criteria. The apparatus is also caused to determine whether to process the at least one query using the one or more values, to generate a recommendation for using the one or more values, to determine one or more alternate values, or a combination thereof based, at least in part, on the comparison.

According to another embodiment, an apparatus comprises means for processing and/or facilitating a processing of at least one query to cause, at least in part, a parsing of one or more terms associated with at least one contextual parameter. The apparatus also comprises means for processing and/or facilitating a processing of the one or more terms to determine one or more values, one or more probabilities associated with the one or more values, or a combination thereof for the at least one contextual parameter based, at least in part, on one or more probabilistic models associated with the at least one contextual parameter. The apparatus further comprises means for causing, at least in part, a comparison of the one or more values, the one or more probabilities, or a combination thereof against at least one threshold criteria. determining whether to process the at least one query using the one or more values, to generate a recommendation for using the one or more values, to determine one or more alternate values, or a combination thereof based, at least in part, on the comparison.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 3 is a flowchart of a process for providing contextual based searches, according to one embodiment;

DESCRIPTION OF SOME EMBODIMENTS

Examples of a method, apparatus, and computer program for providing contextual based searches are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
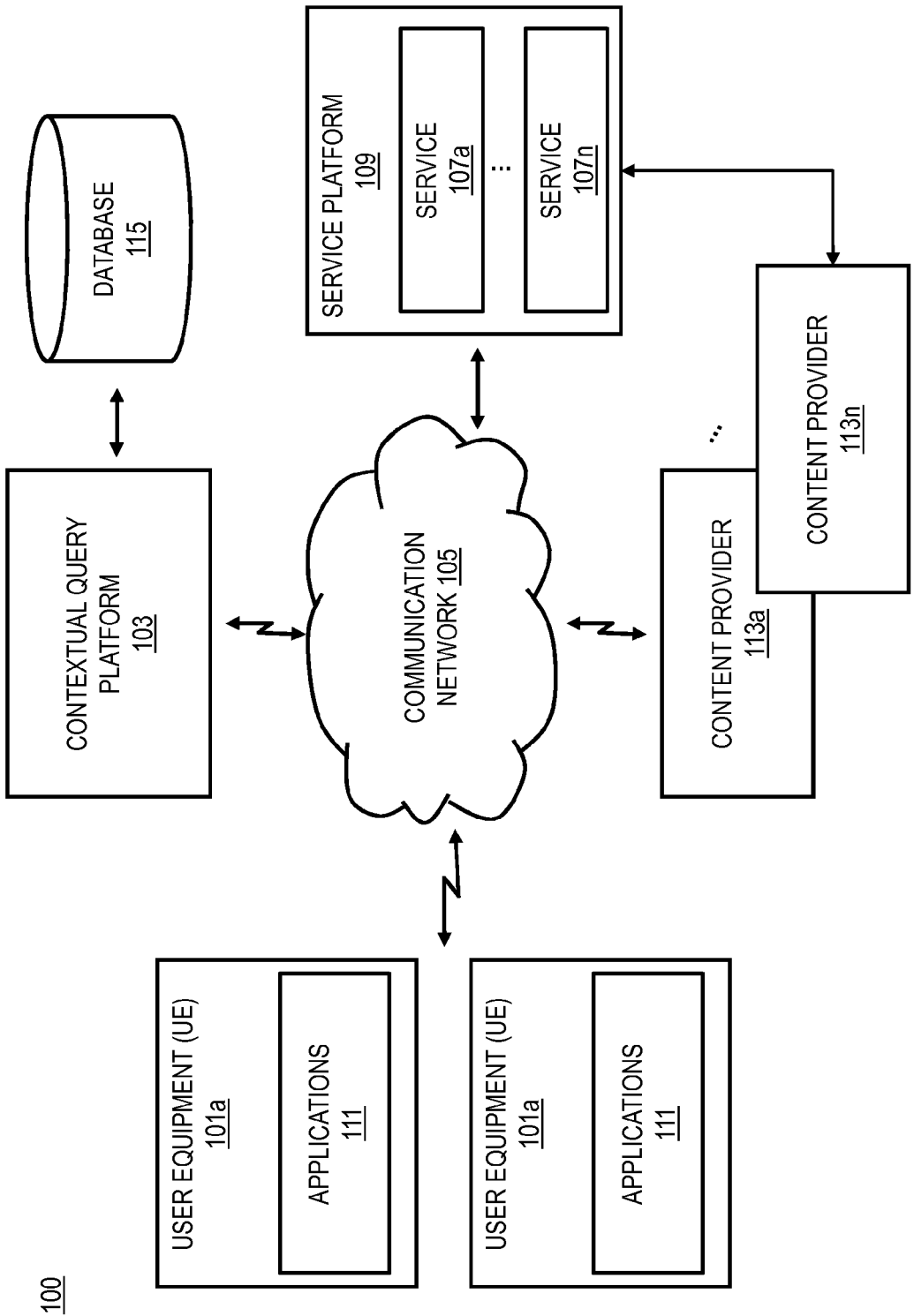
FIG. 1 is a diagram of a system capable of providing contextual based searches, according to one embodiment.

FIG. 1 is a diagram of a system capable of providing contextual based searches, according to one embodiment. As discussed above, a user often would like to use a device to search for specific content. To make a list of returned results related to the content more manageable for the user, service providers often limit the returned results by at least one contextual parameter. Alternatively, the user may limit the returned results directly by associating the query for content with at least one contextual parameter. For example, a user currently in the town of Helsinki that would like to watch a movie in Helsinki may use a service that lists movies by town. In which case, the user will select a town and then be presented a list of movies currently showing in the town. However, this process is not efficient because there are at least two steps (e.g., the first step of selecting the town and the second step of selecting to see movies playing in the town). In some circumstances, service providers allow a user to enter a string search query that contains the contextual parameter, such as "movies in Helsinki." However, current methods used to limit the returned movies to Helsinki are application specific, process intensive, and/or rely on vast amounts of search history. What is needed is a way for a user issue a query for content related to a contextual parameter in a simple way that is not process intensive and easily implemented through various application platforms.

To address this problem, a system 100 of FIG. 1 introduces the capability to provide contextual based searches for queries based on simple algorithms that are fast, versatile and can be implemented across multiple types of application platforms. A user can simply issue a query for a type of content and tailor the query to one or more a contextual parameters that the system recognizes and processes to determine the specific contextual parameter value within the query. The contextual parameter is determined using one or more probabilistic models, at least one index, or a combination thereof to determine whether to limit query search results according to the contextual parameter.

In one embodiment, the system 100 provides for the ability to compare one or more terms that are within a query and that contain a contextual parameter to one or more unigram structures to determine path probabilities and scores for the unigram structures to determine one or more values of the contextual parameter with which to tailor the results of the query. The system uses certain thresholds for the path probabilities and scores to determine whether to include the one or more values in processing the query based on certain factors, such as number of the one or more terms associated with the contextual parameter, the type of the contextual parameter, and the kind of the one or more terms. The system 100 also provides for the ability to generate at least one index to compare the one or more values against to determine at least one value with which to tailor the results of the query and the remaining values with which to present to a user for alternative selection in the event the user intended for the query to be tailored around one of the remaining values. For example, a user may wish to limit certain events that are occurring according to a specific contextual value (e.g., location, time, theater, etc.). If the system 100 fails to select the specific contextual value that the user initially wanted, the system 100 presents alternate values that include the specific value for manual selection.

By way of example, often users search for certain content associated with a particular city. The system 100 provides for a method of detecting the city name within the query and determining whether to tailor the search results from the query according to the detected city name or present one or more alternative city names to the user in a "Did you mean" approach for selecting alternate locations. The system allows for control of automatic tailoring of searches such that city names with alternative meanings, like Opera, Italy or Alice, USA do not improperly limit searches for content regarding "Alice in Wonderland" or "Italian opera" using probabilistic models that include path probabilities and scores, and at least one index, if required. Moreover, the system 100 is able to discriminate between a user searching for the name of an event as opposed to, for example, a small, rural city in the United States, or other value of a contextual value that shares the common name, based on certain thresholds. The system 100 can perform such tailoring based on contextual parameters in a way that is easily implemented across various application platforms without the need of complex context sensing equipment, intensive processing to perform the algorithms, or vast quantities of previous search histories.

As shown in FIG. 1, the system 100 comprises user equipment (UE) 101*a*-101*n* (collectively referred to as UE 101) having connectivity to a contextual query platform 103 via a communication network 105. The UE 101 may execute one or more applications 111, such as, for example, one or more mapping applications, messaging applications, calendar applications, context applications, and sensor applications. The system 100 further comprises a service platform 109, including one or more services 107*a*-107*n* (collectively referred to as services 107) that provide services such as, for example, searching services, location based services, mapping information services, social networking services, etc. to one or more users. The system 100 further comprises one or more content providers 113*a*-113*n* (collectively referred to as content providers 113) that provide content for the services 107 of the service platform 109, the applications of the UE 101, or a combination thereof. In communication with the contextual query platform 103 is a database 115 that stores information used by the contextual query platform 103. In one embodiment, the database 115 is in communication with the contextual query platform 103 independent of the communication network 105. In one embodiment, the database is in communication with the contextual query platform 103 through the communication network 105.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, the contextual query platform 103, the service platform 109 and the content providers 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
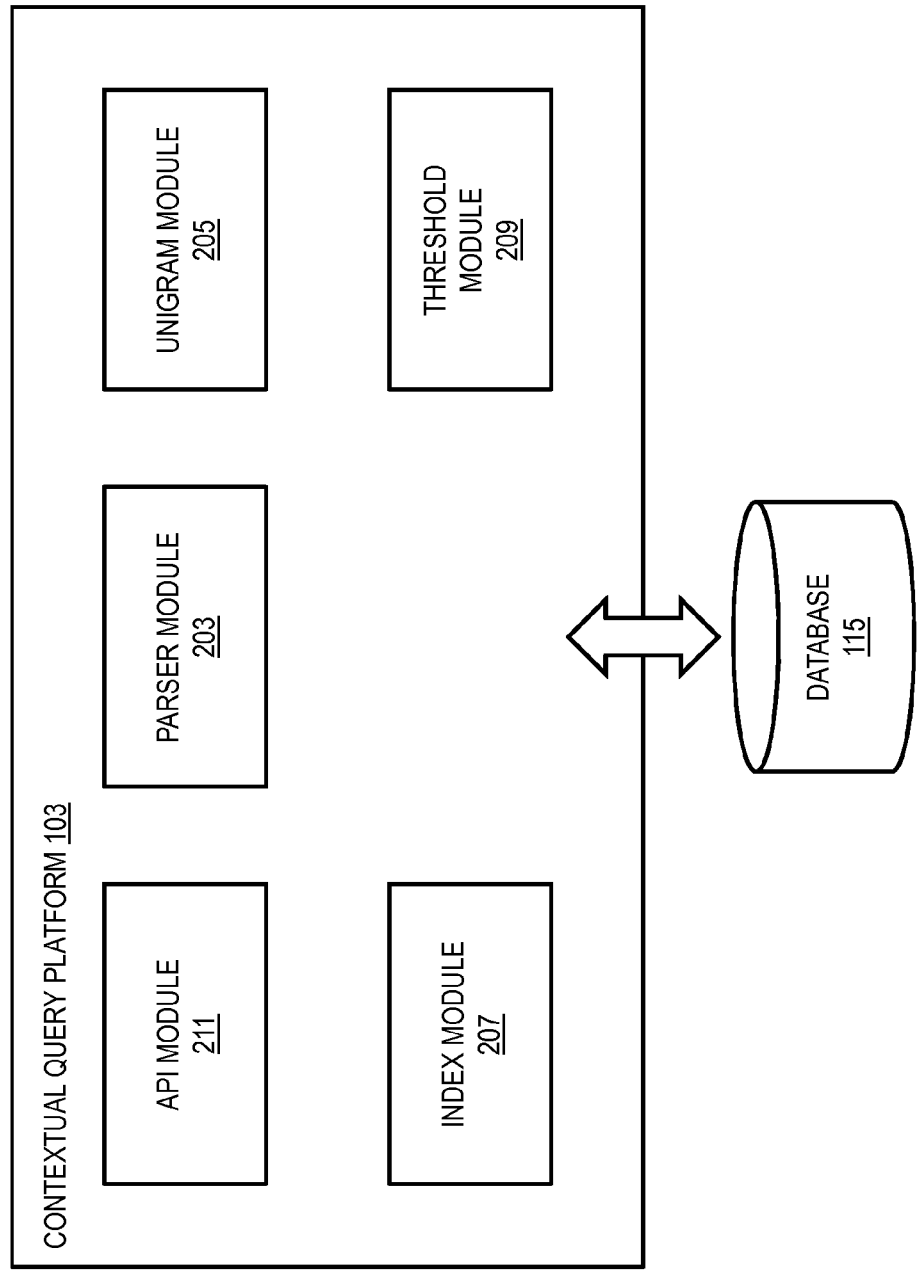
FIG. 2 is a diagram of the components of a contextual query platform, according to one embodiment.

FIG. 2 is a diagram of the components of the contextual query platform 103, according to one embodiment. By way of example, the contextual query platform 103 includes one or more components for providing contextual based searches. It is contemplated that the functions of these components may be combined in one or more components or performed by other components of equivalent functionality. In this embodiment, the contextual query platform 103 includes an application programming interface (API) module 201, a parser module 203, a unigram module 205, an index module 207 and a threshold module 209.

The API module 201 interfaces with one or more applications 111 running on the UE 101, one or more services 107 on the service platform 109, and/or one or more content providers 113. In one embodiment, by way of example, when a user of a UE 101 issues a query using an application 111 running one the UE 101, the application 111 interfaces with the API module 201 of contextual query platform 103 to receive the query from the application 111. In one embodiment, by way of an additional example, when a service 107 on the service platform 109 issues a query to the contextual query platform 103, the service 107 interfaces with the API module 201 of the contextual query platform 103 to receive the query. The API module 201 can also include one or more algorithms to act as a control module to control the overall operation of the contextual query platform 103.

The parser module 203 processes the one or more received queries to parse the queries into one or more terms that are analyzed by the contextual query platform 103. The algorithms used by the parser module 203 can be any conventional algorithm known in the art that can process a string of characters. The string of characters may be entered by a user in a text box, associated with icons illustrated on a map, associated with entries in a drop-down menu, etc. In one embodiment, the contextual query platform 103 receives the query already parsed into the one or more terms by one of an application 111 running on the UE 101, a service 107 on the service platform 109, a content provider 113, or a combination thereof.

The unigram module 205 determines the probabilities and the path scores of the unigram structures based on the one or more terms received from the parser module 203. In one embodiment, the unigram module 205 interfaces with the database 115 to access the unigram structures stored in the database 115 for one or more types of contextual parameters (e.g., location parameters, time parameters, etc.). Upon receiving the one or more terms associated with the contextual parameter of the query and the unigram structures from the database 115, the unigram module 205 compares the one or more terms to the unigram structures for determining the path probabilities and the scores, as discussed in detail below.

The index module 207 generates one or more indexes based on one or more attributes that are common to one or more values determined based on the unigram module 205. The index can be a normalized index, a comparative index, or a combination. By way of example, the population of a city, country or continent is used as an index to determine a specific city, country or continent that a user may wish to tailor query results around. If two or more cities satisfy the path probability and score thresholds, the population of the two cities can be compared to a population of the most populated city of the same country to determine a normalized population factor based on the population index. Using the normalized population factor, the city with the largest normalized population factor is determined more relevant to tailor the query around and the other city is determined as an alternate city that is presented to the user for an alternate selection in case the user intended to mean the alternate city. Under this approach, two cities that share the same name but are in different countries can be more objectively compared to each other to determine which city the user intended.

For example, city A in country A could have a population of 50,000 people and could share the same name with city A' in country B, which has a population of only 10,000 people. Initially, city A appears to be more relevant in a search that includes the city name based purely on the raw populations of the two cities. However, when objectively compared to the populations of the largest cities in Countries A and B, respectively, city A may have a ratio of only 0.003 whereas city A' could have a ratio of 0.25 if the largest city in country B is closer in population to the city A'. Thus, city A' could be the more relevant city to search for rather than city A.

In one embodiment, the populations of the two cities can be compared directly to each other to determine the city with the largest population. In one embodiment, the populations of the two cities could be compared to a standard population value, such that any city with a population above the value is deemed more relevant, and therefore intended to tailor the query results, that a city with a population below the standard population value. If both cities are above the standard population amount, the determination could be based on the difference between the population of each city as compared to the standard population value.

For different contextual parameters besides location parameters, the attribute used to generate the index is different but the process can be the same. For example, if a user is looking for a particular restaurant, such "address McBurger Barn," the index could be based on the gross sales of each of the McBurger Barn stores, number of customers of the McBurger Barn stores, customer ratings of the McBurger Barn stores, etc. Although the attribute can be different, processing of the attribute is the same for the different types of contextual parameters.

The threshold module 209 controls the one or more thresholds that are used by the contextual query platform 103 in determining the one or more values of the contextual parameter within the query. For example, the threshold module 209 controls the one or more thresholds that are used in determining the probability and score paths for the unigram structures, as discussed below. In one embodiment, the contextual query platform 103 does not include threshold module 209. Instead, the various module (e.g., the unigram module 205 and the index module 207) control the thresholds used by the contextual query platform 103.

Figure 7:
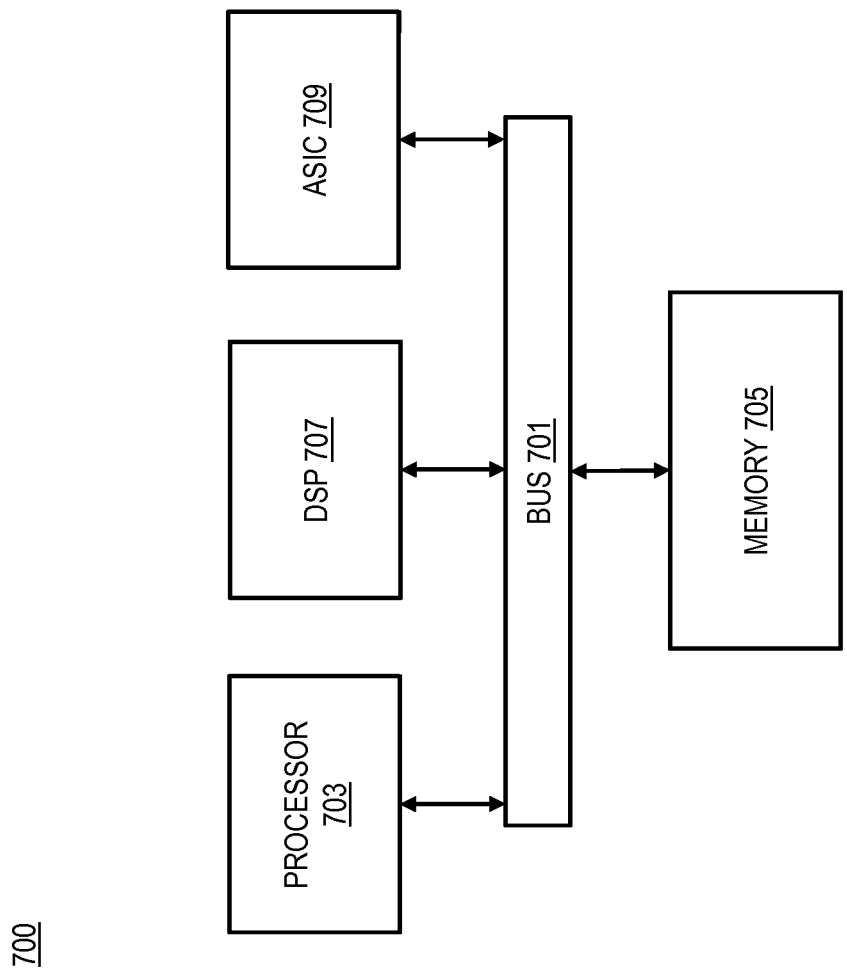
FIG. 7 is a diagram of a chip set that can be used to implement an embodiment of the invention.

FIG. 3 is a flowchart of a process 300 for providing contextual based searches, according to one embodiment. In one embodiment, the contextual query platform 103 performs the process 300 and is implemented in, for instance, a chip set including a processor and a memory as shown in FIG. 7.

In step 301, the contextual query platform 103 receives at least one query. The query can be received from the UE 101, one or more services 107 of the service platform 109, one or more content providers 113, or a combination thereof. For example, in one embodiment, the user interfaces with an application 111 running on the UE 101 to issue a query directed to a service 107 on the service platform 109. The query can be sent to the contextual query platform 103 from the application 111 running on the UE 101, and the processed query can then be sent from the contextual query platform 103 to the service 107. Alternatively, the query can be sent to the contextual query platform 103 from a service 107 on the service platform 109 after the service 107 receives the query from the application 111 running on the UE 101.

In step 303, the contextual query platform 103 parses the query into one or more terms to process the query and determine the contextual parameter associated with the query. The contextual query platform 103 uses one or more algorithms known in the art to parse the query into the one or more terms. In one embodiment, the contextual query platform 103 receives the query already parsed. Thus, in this embodiment, the parsing step is skipped. In one embodiment, the contextual query platform 103 receives large portions of text in the form of, for examples, SMS messages, emails and the like, which are processed for the one or more terms related to a contextual parameter.

In step 305, the contextual query platform 103 determines values associated with the one or more terms based on path probabilities associated with unigram structures of multiple terms related to known values associated with contextual values. In one embodiment, the database 115 includes multiple unigram structures corresponding to the different values for a specific contextual parameter. For example, for a system that handles city names, the database 115 includes unigram structures for the city names grouped by roots of the city names represented by the first letter of each name. Each term of the city name represents a node of the unigram structure under the root. For a city such as "San Antonio De Areco," "S" would be the root of the unigram structure and the structure would be comprised of four nodes: "San," "Antonio," "De" and "Areco."

The contextual query platform 103 compares the one or more terms parsed from the query to the terms represented by the nodes under the roots of the beginning letters of the terms in the order of the terms in the query. In one embodiment, the contextual query platform 103 searches for city names starting with all of the terms in the query in the order the terms are within the query. For example, if the query includes the terms "San Antonio De Areco," the contextual query platform 103 searches under the root "S" for the nodes "San," "Antonio," "De" and "Areco." The contextual query platform 103 also searches under the root "A" for "Antonio," "De" and "Areco." The contextual query platform 103 also searches under the root "D" for "De" and "Areco," and searches under the root "A" for "Areco." Thus, although cities may not exist named "De Areco," for the situation where a user searches for the city "New York," the contextual query platform 103 will search under the root "N" for "New York" and will search under the node "Y" for "York," both of which are cities. Therefore, the contextual query platform 103 will determine that "New York" and "York" are the possible cities that a user is attempting to tailor query results.

In one embodiment, the contextual query platform 103 includes Boolean operators after city names such that once a city name is found, the contextual query platform 103 stops searching for additional city names that are smaller than the matched city. For example, where the user searches for "New York," once the contextual query platform 103 determines that "New York" is a possible city, the contextual query platform 103 will determine not to search for cities of a smaller subset of terms, such as for the city named "York" under the root "Y."

The terms are compared to the unigram structures by matching the letters of each term with the letters of the terms associated with the node and dividing by the total length of the unigram structures representing each value. For example, if a user searched for "San Antonio De Areco," all cities beginning with the term "San" will have three letters that match the queried city. Thus, these cities will have at least a probability of 3/(total letters in each city name). In one embodiment, however, terms of fewer than 4 letters are considered stop words and are not given a probability value unless they precede additional terms in the queried contextual parameter. For example, "San" by itself is given a probability value of zero because it is less than three letters long. However, once "San" is combined with "San Antonio," "San" would then represent three letters of the total number of letters for determining the probability of the unigram structure. For cities that begin with "San Antonio," these cities will have at least a probability of 10/(total letters in each city name). This is done, for example, to make the process for determining the contextual parameter language independent.

In one embodiment, once the searched for contextual parameter is determined to have more terms than terms in some unigram structures, these unigram structures are given a probability value of zero. For example, if a user searched for "San Antonio De Areco," which has four terms, cities without four terms (e.g., San Anselmo, San Antonio, San Augustine) would be given probability values of zero. As more cities are found that match more terms within the query, the probabilities of cities with fewer terms than the terms within the query are updated accordingly.

In one embodiment, the number of terms found within the query does not automatically reduce the probability of cities with fewer terms to zero. Rather, the probabilities of those cities are adjusted so that the number of letters that match the queried city name within the unigram structures are divided by the number of letters in the query rather than the number of letters within the unigram structure. For example, if the queried city is "San Antonio De Areco," and a unigram structure for the city "San Augustine" exists, the probability for "San Augustine" would be 4/17 rather than zero despite there not being four terms in San Augustine. Additionally, in this case, where the number of terms in a city name is less than the number of terms found in a contextual parameter, the probability becomes based on the length of the contextual parameter rather than based on the length of each unigram structure. For example, in the above example, the probability for "San Augustine" is 4/17 and not 4/12 because of the number of letters in "San Antonio De Areco."

In one embodiment, a Boolean value is used to signal a city name that matches a queried contextual parameter. For example, where a user searches for "San Antonio," because San Antonio is a city, the Boolean variable is determined to be true such that the unigram structure for "San Antonio" is given a probability of 1.0. However, because the Boolean variable is determined to be true, the unigram structures that begin with "San Antonio" are also given probability values of 1.0 despite not all of the letters of the terms of these additional unigram structures being present in the queried term. Under this approach, the contextual query platform 103 attempts to guess values of the contextual parameter based on partial matches.

In step 307, the contextual query platform 103 determines path scores associated with one or more terms based on the unigram structures. In one embodiment, the contextual query platform 103 determines path scores for all of the unigram structures. In one embodiment, the contextual query platform 103 determines the path scores for the highest valued probability unigram structures from step 305 (e.g., probability of 1.0 in the above examples). In one embodiment, the contextual query platform 103 determines the path scores for unigram structures with probabilities above a certain threshold probability (e.g., 0.80, 0.90 or 0.95).

Similar to the probabilities discussed above, the path scores are calculated by comparing the terms within the query to the terms within the nodes of the unigram structure. For example, if the terms in the query are "San Antonio," the unigram structure for "San Antonio" would have a path score of 1.0. However, unlike the example above using the Boolean variable to make the probability of "San Antonio De Areco" be 1.0 for a query of "San Antonio," the path score for "San Antonio De Areco" would be 10/17 or 0.59 because only ten of the seventeen letters of the unigram structure match the letters of the query.

In step 309, the contextual query platform 103 compares the path scores to thresholds associated with a set number of terms. This allows the contextual query platform 103 to set a specificity of the query required for the contextual query platform 103 to automatically tailor a search according to a specific value of a contextual parameter. By way of example, for values that are composed of two words, a path score of 0.4 is needed before the value can be used to tailor the query. For values composed of three words, a path score of 0.6 is needed before the value can be used to tailor the query. For values composed of four words, a path score of 0.8 is needed before the value can be used to tailor the query. However, these path scores are merely exemplary and can be modified to tailor the results. If the values have path scores that match or exceed the thresholds, the values continue to be processed by the contextual query platform 103 according to the process 300. If the values have path scores that do not match or exceed the thresholds, the values are temporarily stored in the database 115 or the unigram module 205 to be used later. If the values have less than or more than a set threshold amount of terms, the value may continue to be processed by the contextual query platform 103 according to the process 300. For example, if the value associated with the contextual parameter comprises only one term, there may be no threshold determination or the threshold determination may be a path score of at least zero or higher (e.g., effectively no threshold).

In step 311, the contextual query platform 103 determines to generate at least one index based on at least one attribute common to the one or more values that meet the thresholds of step 309. The index allows the contextual query platform 103 to objectively compare the values to each other. By way of example, if the contextual parameter is a location of a city name, the attribute can be the population, area, age, etc. of the city, or a combination thereof. If the contextual parameter is a store, the attribute can be the sales volume of stores, the distance stores are from a set point, such as a city center, etc.

In step 313, the contextual query platform 103 evaluates the specific attributes for the one or more values compared against the at least one index. For example, where the contextual parameter is a city and the index is population, the populations of the cities determined from the query are compared to a baseline population value, such as the population of the most populated city in the same country as the city represented by the value. If the value determined from the query is associated with the city of Chicago, Ill., USA, with an approximate population of 2.7 million people, that population is compared to the population of the most populated city in the USA, which is, for example, New York, N.Y., USA with an approximate population of 8.2 million, giving a comparison ratio of approximately 0.33. As discussed above, the comparison according to the index can be determined according to different approaches. The attribute values for the one or more values associated with the contextual parameter can be compared to each other, in the event there are more than one values, or can be compared to a any baseline attribute value (e.g., the city with the lowest population, store with the lowest sales, country with the lowest gross domestic product, etc.).

In one embodiment, such as, for example, when values of the contextual parameter that comprise only one word, the value of the contextual parameter is compared to the index to determine whether to tailor the search to the value regardless of whether there are other values to be compared to the index. For example, for a city name that is comprised with only one term, to determine that the search query should be tailored to the city name and to distinguish the city name from a reference to some other object that has the same name, the city must have, for example, a population ratio as compared to the largest city in the country of greater than 0.01. This determines that, when someone searches for "opera in Italy," the search is not erroneously tailored to the city Opera, Tenn., USA that has a comparatively small population as compared to New York City, and therefore assumed not to be related to the query. However, the city is still saved by the index module 207 or the database 115 and presented to the user in case the user actually meant to narrow the search down to Opera, Tenn., USA.

In one embodiment, a comparison of the values of the contextual parameter that satisfied the path probability and score is always performed, regardless of the number of terms that comprise the values of these contextual parameters and regardless of whether there are more than one of these values. In one embodiment, a comparison is of the values of the contextual parameter is performed only if the value did not satisfy all of the thresholds and is not the remaining value left for comparison to the index.

In step 315, the contextual query platform 103 determines the one or more values to process the query or to generate recommendations based on in order to limit the requested content or to generate context according to the context associated with the one or more values of the contextual parameter. In one embodiment, the selected value will be the value associated with the unigram structure that satisfied the three threshold requirements of the probability, path score and comparison to the index.

In step 317, the contextual query platform 103 determines to present any of the other values that did not satisfy all three thresholds but still satisfied one or more thresholds for alternate selection by the user in the event that the user meant to limit the query to another specific value of the contextual parameter besides the value selected by the contextual query platform 103. For example, if the probabilities and path score determined that the user intended to tailor the search to San Antonio, Tex., USA, or San Antonio, Spain, but the comparison of both cites to a population index determined to tailor the search specifically to San Antonio, Tex., USA, San Antonio, Spain would also be presented to the user along with the results of the query for an alternative selection by the user. For example, the contextual query platform 103 will determine or cause, at least in part, to modify a user interface accordingly to display a "Did you mean" section that lists the alternate values determined during the process 300.

In one embodiment, the contextual query platform 103 prompts a service 107 on the service platform and/or an application 111 or sensor on the UE 101 for context information to use to sort the alternate values of the contextual parameter. For example, in one situation, a user is looking for a certain store, and one store is found based on consumer reviews, along with other stores that are considered alternate values of the contextual parameter based on the index of the consumer reviews. The store selected as the value of the contextual parameter may not be the closed store to the consumer, despite it being the highest rated in the consumer reviews. In this situation, the alternate values of the contextual parameter (alternate stores) can be prioritized in the "Do you mean?" section according to their distance from the user, such as closest first or farthest first. In one embodiment, the alternate values of the contextual parameter can be prioritized according to the attributes used in comparison to the index in addition to the distance from the user such that the highest rated/closet store is presented first. One or more other pieces of context information can be used to prioritize the alternate values of the contextual parameter.

In step 319, the contextual query platform 103 determines whether any of the other values that did not satisfy all three thresholds but still satisfied one or more thresholds for alternate selection where selected. If the contextual query platform 103 determines that one of the other values were selected, the process 300 proceeds to step 321. If the contextual query platform 103 determines that none of the other values were selected, the process 300 ends.

In step 321, the contextual query platform 103 determines that one of the other values were selected to process the query. In response, the contextual query platform 103 determines to process the query or generate recommendations based on the one of the other values. For example, a user may have entered the query "movies in Paris" and the contextual query platform 103 may have determined to generate recommendations for movies that are playing in Paris, France. However, the user may have intended to search for movies playing in Paris, Tex., USA. Accordingly, Paris, Tex., USA, having passed at least two thresholds for having the same name as Paris, Tex. but failing the index threshold, will be included on a, for example, "Did you mean?" list for selection by the user. Because the user did in fact mean Paris, Tex., USA, the user can select the correct value of the contextual parameter and receive recommendations or content results based on movies in Paris, Tex., USA. After a determination of "No" at step 319 or after step 321, the process ends and the contextual query platform 103 waits for another query.

Figure 4A:
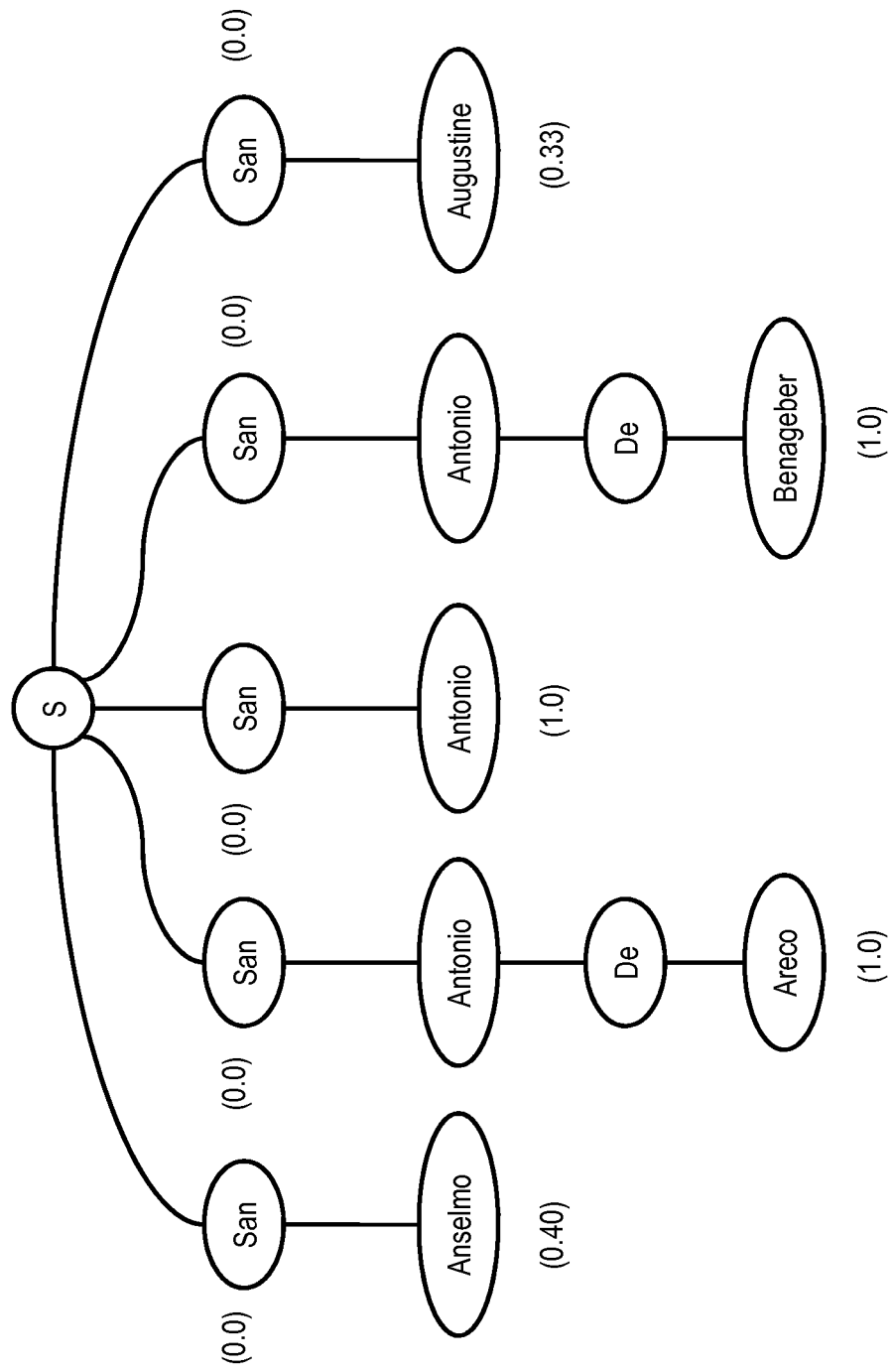
FIGS. 4A and 4B are diagrams of unigram structures utilized in the process for providing contextual based searches, according to various embodiments.
Figure 4B:
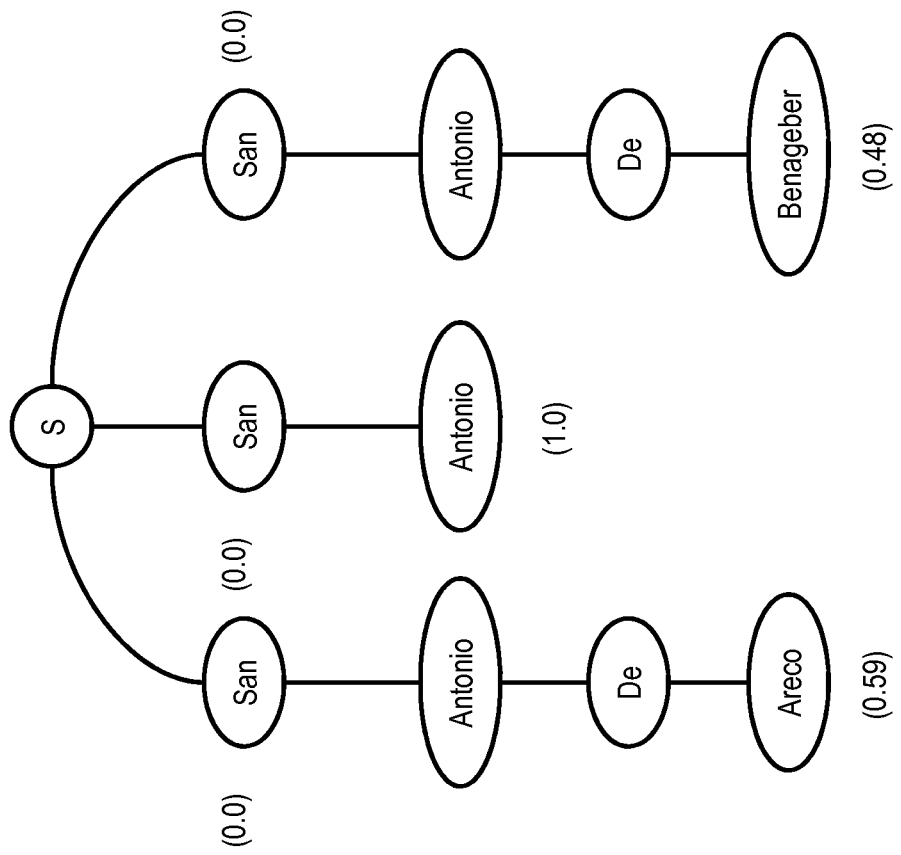

FIGS. 4A and 4B are diagrams of unigram structures utilized in the process 300 for providing contextual based searches, according to various embodiments. As illustrated in FIG. 4A for one example, a snapshot of various unigram structures are illustrated, which include five illustrated unigram structures. The five unigram structures all extend from the root of the path represented by the letter "S." Taking location as an example of the contextual parameter specifically cities—the letter S would represent the first letter of the various city names. Each node of the unigram structures is represented by a term that makes up the city name. The illustrated unigram structures are for the cities San Anselmo, San Antonio De Areco, San Antonio, San Antonio De Benageber and San Augustine. As illustrated, the probabilities for each term are next to the associated term. As discussed above, the illustrated probabilities for each node (term) are calculated based on an exemplary embodiment where a user associates a request for content with the term "San Antonio." Because the term "San" is less than 4 letters long, the term is considered a stop word and is temporarily assigned a probability value of 0 prior to considering additional terms coming after the term. Because the third unigram structure (middle unigram structure) is for the nodes "San Antonio," the probability value assigned to this unigram structure is 1.0 after considering both terms "San" and "Antonio." Because the second and fourth unigram structures also begin with "San Antonio," the second and fourth unigram structures also have a probability value of 1.0 if a Boolean variable indicates that "San Antonio" is, by itself, a city and the first ten letters of each city represented by the second and fourth unigram structures ("San Antonio De Areco" and "San Antonio De Benageber") are "San Antonio." The first and fifth unigram structures have probabilities values of 0.40 and 0.33, respectively, because "San Anselmo" and "San Augustine" share only five and four letters with "San Antonio" out of a total of ten and twelve letters, respectively. Thus, based on the searched terms "San Antonio" for this example, the contextual query platform 103 determined that the user intended to tailor the search to either "San Antonio De Areco," "San Antonio" or "San Antonio De Benageber" as these cities have the highest probabilities. Depending on thresholds set regarding the probabilities, the cities "San Anselmo" and "San Augustine" may be discarded or remember as alternate values for the contextual parameter and presented to the user for alternate selection.

As illustrated in FIG. 4B for one example, a snapshot of various unigram structures for determining path scores are illustrated, which include three unigram structures (e.g., the three unigram structures from FIG. 4A with the highest probabilities). Assuming, again, that the user searched for the term "San Antonio," the first, second and third unigram structures have path scores of 0.59, 1.0 and 0.48, respectively. These scores are calculated, for example, based on the searched terms "San Antonio" matching ten of the seventeen letters for "San Antonio De Areco," all ten of the ten letters for "San Antonio" and ten of the twenty-one letters for "San Antonio De Benageber." Comparing these path scores to exemplary path score thresholds of 0.40 for two-termed cities, 0.60 for three-termed cities, and 0.80 for four-termed cities, as discussed above, FIG. 4B visualizes that the contextual query platform 103 would not have automatically selected "San Antonio De Areco" or "San Antonio De Benageber" as the city to tailor the search because each city name includes four terms and the path scores are below the 0.80 threshold. However, the contextual query platform 103 would have automatically selected "San Antonio" as the city to tailor the search because the city name includes two terms and the path score is above the 0.40 threshold. In such an example, comparing the "San Antonio" to an index can be skipped because there is only one city that satisfied the probability and path score thresholds and because the city name is, for example, more than one term. However, if in the example there was a unigram structure for San Antonio, Tex., USA and a unigram structure for San Antonio, Spain, further analysis of the values would be needed as compared to an index to determine which one of the two cities the search should be tailored to, if any.

Figure 5:
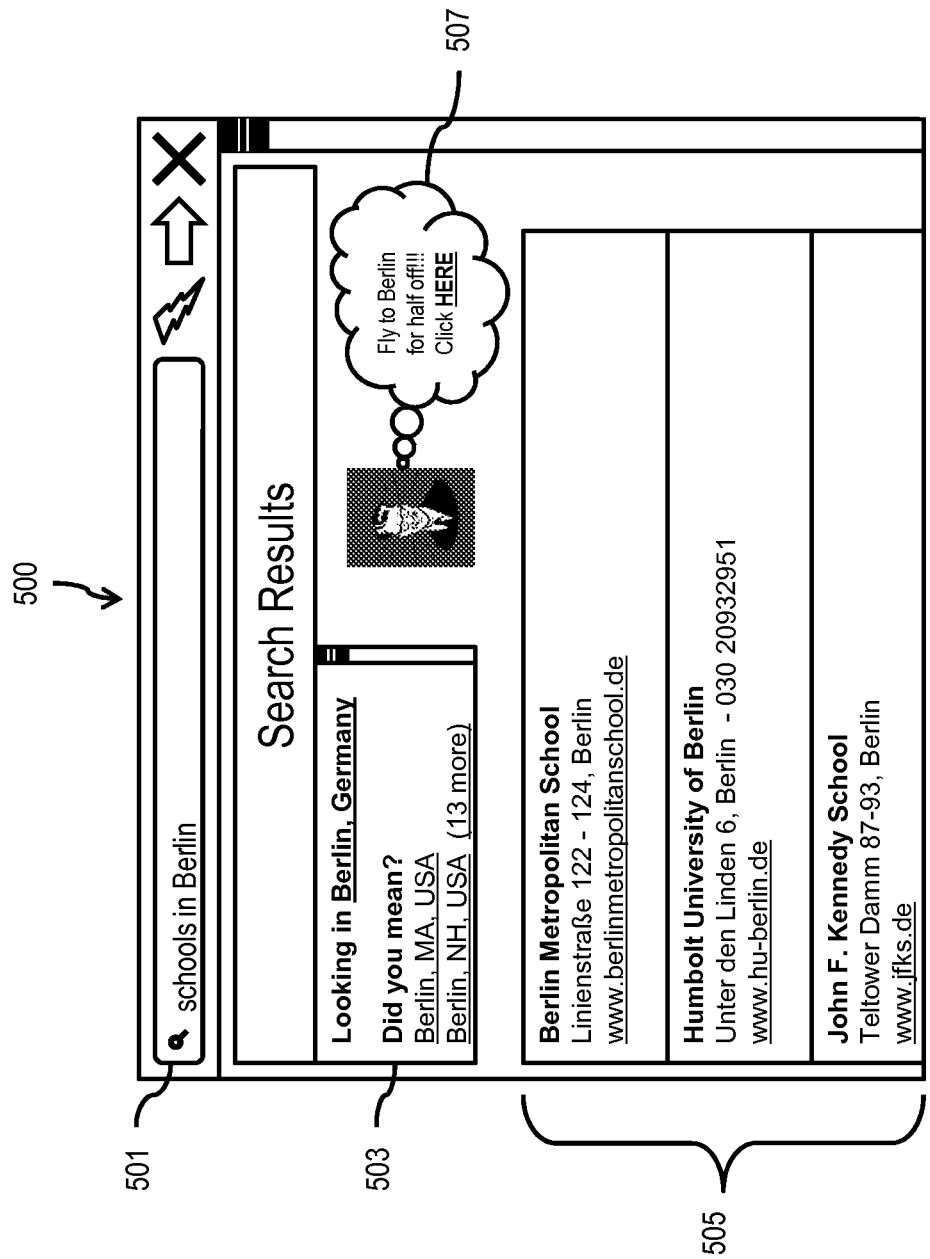
FIG. 5 is a diagram of a user interface utilized in the process of FIG. 3, according to one embodiment.

FIG. 5 is a diagram of a user interface 500 utilized in the process of FIG. 3, according to one embodiment. The user interface 500 includes an indicator 501 that allows a user to enter a search query in the form of, for example, a search string that may include the content the user would like to receive information on (e.g., schools) and the contextual parameter (e.g., city, specifically Berlin). Although illustrated as a box that accepts user input in for the form of text, various other method could be use for initiating the search query (e.g., icons, drop-down lists, etc.). The user interface 500 also includes an indicator 503 that displays the specific value of the contextual parameter that was determined by the contextual query platform 103 and used to process the query. In the illustrated embodiment, the contextual query platform 103 determined to tailor the search for schools associated with Berlin, Germany based on the probabilistic models and, for example, a population index as illustrated by "Looking in Berlin, Germany." In the illustrated embodiment, the indicator 503 also include the alternate values of the contextual parameter that the user may have intended to tailor the search to, such as, for example, Berlin, Mass., Berlin, N.H., or 13 other cities that include the term Berlin. By displaying the alternate values of the contextual parameter, the indicator 503 allows users of the user interface 500 to easily switch between values of the desired contextual parameter in the event, for example, that the user intended a different value of the contextual parameter or the user would like to receive more information on other, non-intended specific values. The user interface 500 also includes an indicator 505 that includes the content results that were returned after tailoring the search related to the content of schools to the specific value of the contextual parameter of "Berlin, Germany." As illustrated in FIG. 5, the content results all share the commonality of being located in Berlin, Germany. In one embodiment, the user interface 500 also includes an indicator 507 that can include messages triggered by the detection of one or more contextual parameters, one or more values of the contextual parameters, or a combination thereof. For example, when the contextual parameter concerns a specific value, such as a city, the indicator 507 can include messages regarding advertisements related to the city (e.g., discount airline tickets for visiting the city, events going on in the city, sales at stores in the city, etc.).

The processes described herein for providing contextual based searches may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
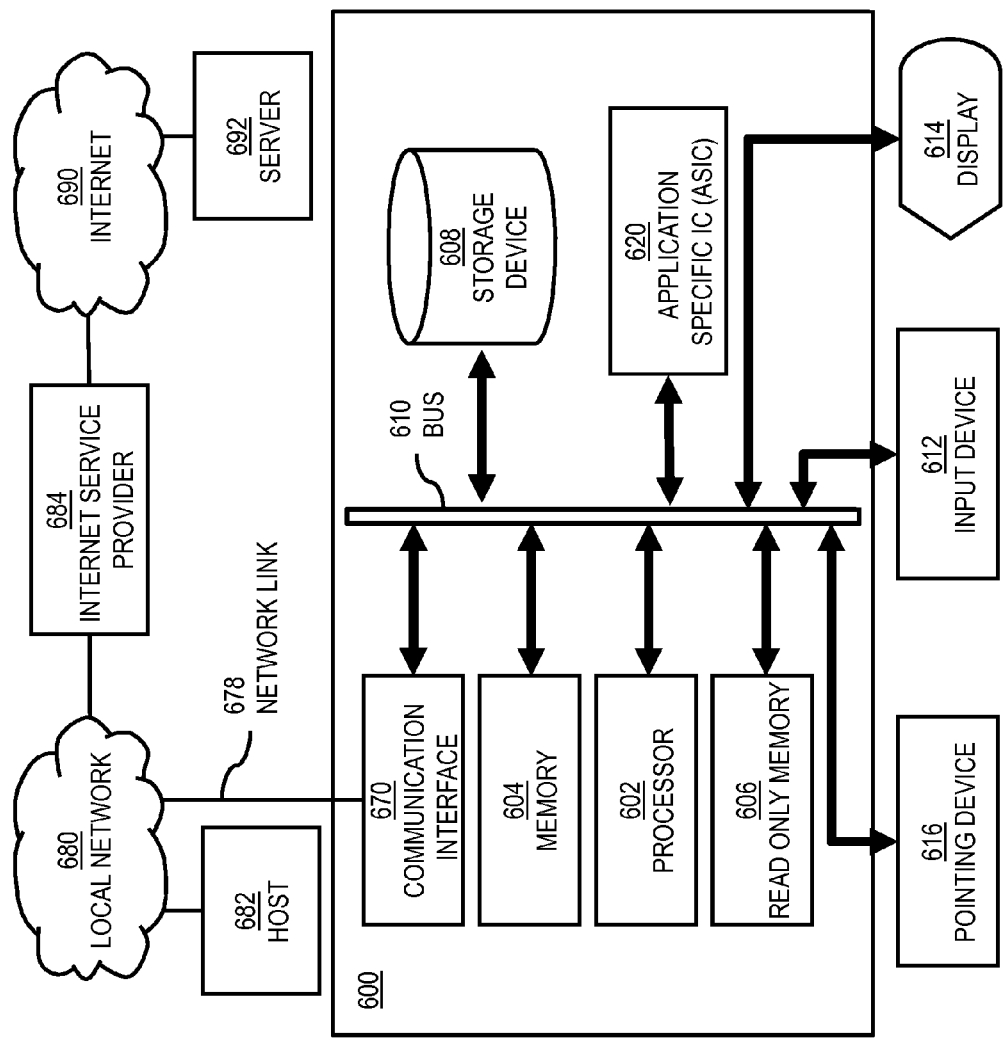
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to provide contextual based searches as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of providing contextual based searches.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to providing contextual based searches. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for providing contextual based searches. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for providing contextual based searches, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for providing contextual based searches to the UE 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to provide contextual based searches as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of providing contextual based searches.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to provide contextual based searches. The memory 705 also stores the data associated with or generated by the execution of the inventive steps.

Figure 8:
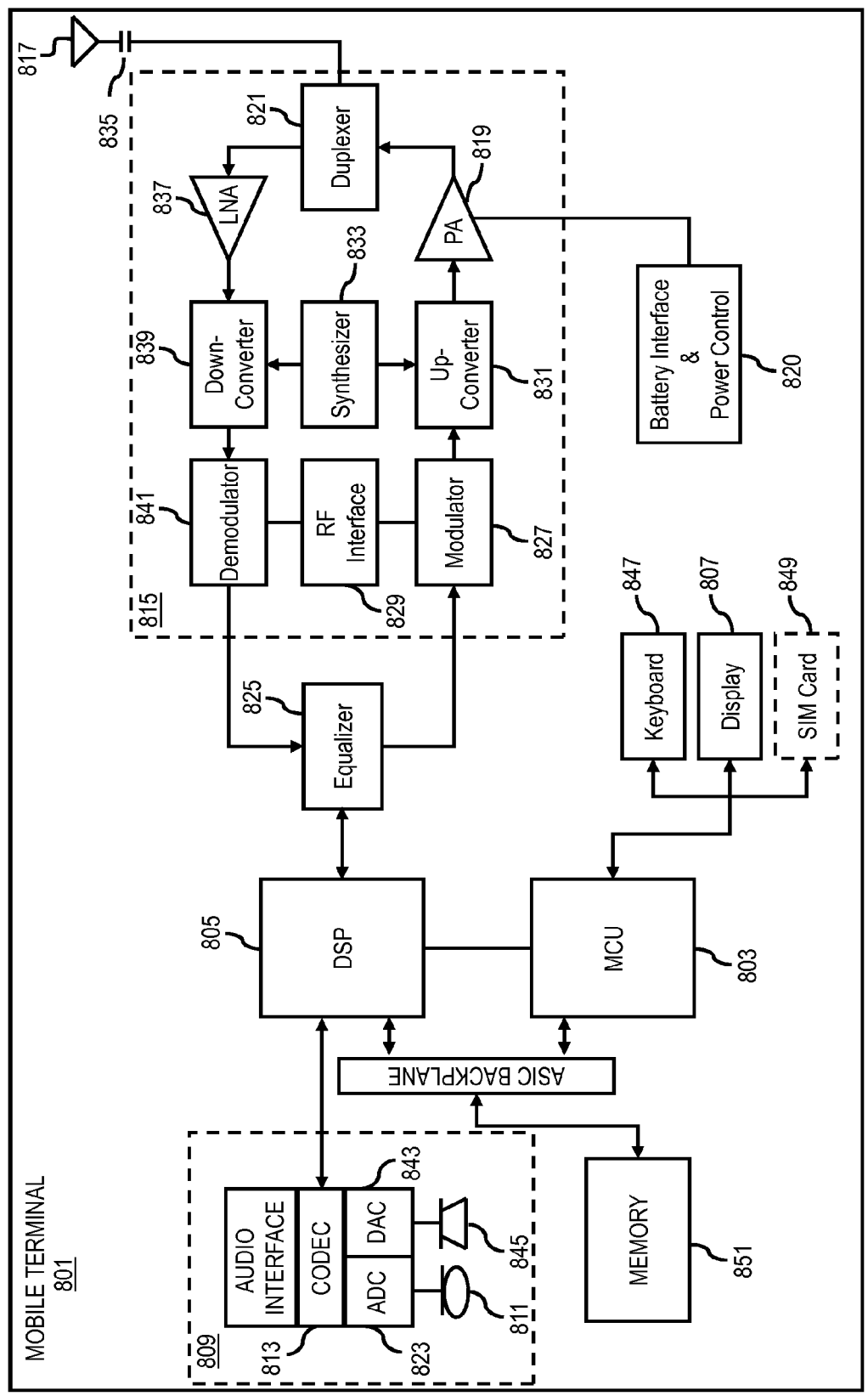
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of providing contextual based searches. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of providing contextual based searches. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to provide contextual based searches. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
    a processing of at least one query to cause, at least in part, a parsing of one or more terms associated with at least one contextual parameter;
    a processing of the one or more terms to determine one or more values, one or more probabilities associated with the one or more values, or a combination thereof for the at least one contextual parameter based, at least in part, on one or more probabilistic models associated with the at least one contextual parameter;

a processing of a total number of words associated with the one or more terms, the at least one contextual parameter, or a combination thereof to determine at least one threshold criteria;

a comparison of the one or more values, the one or more probabilities, or a combination thereof against the at least one threshold criteria; and a determination of whether to process the at least one query using the one or more values, to generate a recommendation for using the one or more values, to determine one or more alternate values, or a combination thereof based, at least in part, on the comparison.

2. A method of claim 1, wherein the one or more probabilistic models include one or more unigram structures.

3. A method of claim 2, wherein the (1) data and/or (2) information and/or (3) at least one signal are further based, at least in part, on the following:

one or more path probabilities associated with respective paths of the one or more unigram structures; and an evaluation of the one or more terms against the respective paths to determine the one or more values, the one or more probabilities, or a combination thereof based, at least in part, on the one or more path probabilities.

4. A method of claim 1, wherein the (1) data and/or (2) information and/or (3) at least one signal are further based, at least in part, on the following:

a processing of one or more attributes common to the one or more values, the one or more alternate values, or a combination thereof to generate at least one index, wherein the determining of the one or more values, the one or more alternative values, or a combination thereof is further based, at least in part, on the at least one index.

5. A method of claim 4, wherein the (1) data and/or (2) information and/or (3) at least one signal are further based, at least in part, on the following:

a number of words associated with the one or more values, the one or more alternate values, the one or more terms, or a combination thereof is below a minimum value, wherein the determining of whether to process the at least one query using the one or more values, to generate the recommendation for using the one or more values, or a combination thereof is further based, at least in part, on the at least one index.

6. A method of claim 4, wherein the at least one index is based on a baseline attribute value, an attribute value of the one or more values, an attribute value of the one or more alternate values, or a combination thereof.

7. A method of claim 1, wherein the one or more values are determined based, at least in part, on a first letter of the one or more the terms.

8. A method of claim 1, wherein the (1) data and/or (2) information and/or (3) at least one signal are further based, at least in part, on the following:

a determination that the total number of words associated with the one or more terms, the at least one contextual parameter, or a combination thereof is below a minimum value, wherein the at least one threshold criteria applies for above the minimum value.

9. A method of claim 1, wherein the at least one contextual parameter includes, at least one location parameter, and the one or more values identifies, at least in part, a location.

10. A method of claim 1, wherein the (1) data and/or (2) information and/or (3) at least one signal are further based, at least in part, on the following:

a determination to cause, at least in part, a presentation of the one or more alternate values for selection; and a determination whether to process the at least one query using the one or more alternate values, to generate a recommendation for using the one or more alternate values, or a combination thereof based, at least in part, on a selected one of the one or more alternate values.

11. An apparatus comprising:

at least one processor; and at least one memory including computer program code for one or more programs, the at least one memory and the computer program code configured to, with the at least one processor, cause the apparatus to perform at least the following, process and/or facilitate a processing of at least one query to cause, at least in part, a parsing of one or more terms associated with at least one contextual parameter;

process and/or facilitate a processing of the one or more terms to determine one or more values, one or more probabilities associated with the one or more values, or a combination thereof for the at least one contextual parameter based, at least in part, on one or more probabilistic models associated with the at least one contextual parameter;

process and/or facilitate a processing of a number of words associated with the one or more terms, the at least one contextual parameter, or a combination thereof to determine at least one threshold criteria;

cause, at least in part, a comparison of the one or more values, the one or more probabilities, or a combination thereof against the at least one threshold criteria; and determine whether to process the at least one query using the one or more values, to generate a recommendation for using the one or more values, to determine one or more alternate values, or a combination thereof based, at least in part, on the comparison.

12. An apparatus of claim 11, wherein the one or more probabilistic models include one or more unigram structures.

13. An apparatus of claim 12, wherein the apparatus is further caused to:

determine one or more path probabilities associated with respective paths of the one or more unigram structures; and cause, at least in part, an evaluation of the one or more terms against the respective paths to determine the one or more values, the one or more probabilities, or a combination thereof based, at least in part, on the one or more path probabilities.

14. An apparatus of claim 11, wherein the apparatus is further caused to:

process and/or facilitate a processing of one or more attributes common to the one or more values, the one or more alternate values, or a combination thereof to generate at least one index, wherein the determining of the one or more values, the one or more alternative values, or a combination thereof is further based, at least in part, on the at least one index.

15. An apparatus of claim 14, wherein the apparatus is further caused to:

determine that a number of words associated with the one or more values, the one or more alternate values, the one or more terms, or a combination thereof is below a minimum value, wherein the determining of whether to process the at least one query using the one or more values, to generate the recommendation for using the one or more values, or a combination thereof is further based, at least in part, on the at least one index.

16. An apparatus of claim 14, wherein the at least one index is based on a baseline attribute value, an attribute value of the one or more values, an attribute value of the one or more alternate values, or a combination thereof.

17. An apparatus of claim 11, wherein the one or more values are determined based, at least in part, on a first letter of the one or more the terms.

18. An apparatus of claim 11, wherein the apparatus is further caused to:

determine that the total number of words associated with the one or more terms, the at least one contextual parameter, or a combination thereof is below a minimum value, wherein the at least one threshold criteria applies for above the minimum value.

19. An apparatus of claim 11, wherein the at least one contextual parameter includes, at least one location parameter, and the one or more values identifies, at least in part, a location.

20. An apparatus of claim 11, wherein the apparatus is further caused to:

determine to cause, at least in part, a presentation of the one or more alternate values for selection; and determine whether to process the at least one query using the one or more alternate values, to generate a recommendation for using the one or more alternate values, or a combination thereof based, at least in part, on a selected one of the one or more alternate values.

* * * * *